United States Patent Office 2,779,788
Patented Jan. 29, 1957

2,779,788

TRICHLOROMETHANE SULPHENIC ACID DERIVATIVES

Hans Gysin and Alfred Margot, Basel, Switzerland, assignors to J. R. Geigy A. G., Basel, Switzerland, a Swiss firm No Drawing. Application October 27, 1953,
Serial No. 388,674

Claims priority, application Switzerland October 31, 1952

2 Claims. (Cl. 260—556)

The present invention is concerned with new trichloromethane sulphenic acid derivatives, their production and their use in combatting fungi. U. S. Patent No. 2,553,775 claims trichloromethane sulphenic acid amides, the amide group of which is substituted by an acyl radical. As compounds with a sulphonic acid radical as acyl substituent of the amide group, benzene sulphone-N-trichloromethane sulphenyl anilide and benzene sulphone-N-trichloromethane sulphenyl-N-butyl amide are cited. On the other hand, trichloromethane sulphen amides acylated by chloromethane sulphonic acid have not been known up to the present. It has now been found that such compounds of the general formula:

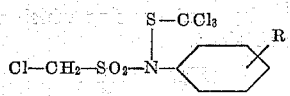

wherein R represents hydrogen, chlorine, methyl or nitro. $R_2$ represents hydrogen, a chlorine atom or a methyl group, have a strong fungicidal action. The fungicidal action of these anilides of the chloromethane sulphonic acid is by far superior to that of the two known amides of the aromatic benzene sulphonic acid above mentioned. Some of the compounds in addition have a bactericidal action. These compounds are particularly suitable for combatting fungi which are plant parasites; in the concentration necessary to attain a fungicidal action, no damage is caused to the host plants.

The new compounds can be obtained by reacting sulphonic acid amides or salts thereof of the general formula:

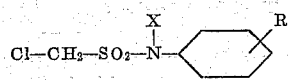

wherein X represents hydrogen or another monovalent cation such as an alkali metal cation, and R has the meaning given above, with trichloromethane sulphenyl chloride (perchloromethyl mercaptane). Good yields are obtained.

The reactions mentioned above can be performed in water or in inert organic solvents. If salts of the sulphonic acid amides are not used as starting materials, the reaction can be accelerated by the addition of acid binding agents, in water e. g. with caustic soda lye. It can be accelerated in organic solvents also with sodium or potassium carbonate or acetate or also with tertiary organic bases.

N-chloromethane sulphonyl derivatives of aniline, 2-, 3- and 4-chloraniline, o-, m- and p-toluidine, and o-, m- and p-nitraniline are named as sulphonic acid amides of the general formula:

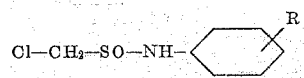

which can be obtained easily by treating the corresponding amines with chloromethane sulphochloride, e. g. in pyridine or in an inert solvent in the presence of a tertiary base.

The new N-trichloromethane sulphenyl amides of chloromethane sulphonic acid are mostly solid crystalline bodies. The following examples serve to illustrate the invention further. Parts are given as parts by weight and the relationship of parts by weight to parts by volume is as that of grammes to cubic centimetres. The temperatures are in degrees centigrade.

EXAMPLE 1

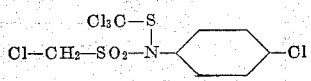

18.6 parts of perchloromethyl mercaptane are added dropwise while stirring well at about 10° to 24.0 parts of chloromethane sulphone-4-chloranilide in 100 parts by volume of N-caustic soda lye, and the whole is then stirred for some hours at room temperature. The chloromethane sulphone-N-trichloromethane sulphenyl-4-chloranilide formed is drawn off under suction and well washed with water. Recrystallised from methanol, the colourless product melts at 113–114°.

The following can be produced for example in an analogous manner:

Chloromethane sulphone-N-trichloromethane sulphenyl anilide, M. P. 133–134°; chloromethane sulphone-N-trichloromethane sulphenyl-p-toluidide, M. P. 89–90°; chloromethane sulphone-N-trichloromethane sulphenyl-2-chloranilide, M. P. 100–101°; chloromethane sulphone-N-trichloromethane sulphenyl-3-chloranilide, M. P. 89–88°; chloromethane sulphone-N-trichloromethane sulphenyl-o-toluidide, M. P. 101–102°; chloromethane sulphone-N-trichloromethane sulphenyl-m-nitranilide, M. P. 89–90°; chloromethane sulphone-N-trichloromethane sulphenyl-p-nitranilide, M. P. 63–64°.

The excellent fungicidal activity of the new compounds according to this invention can be seen from the results of slide germination tests which are summarised in the following tables.

In the tables, that amount of the tested compounds is given in γ per square centimetre which was able to prevent the germination in a damp atmosphere of at least 9/10 of the spores spread on the slides. The active coatings were obtained by distributing uniformly the acetone solution of the compounds in different concentrations on the slides and allowing the solvent to evaporate; 4 slides were used for each coating tested of each compound.

Table 1

| No. | Compound (T=—S—CCl₃) | Necessary amount in γ per cm.² to prevent germination of the spores of— | | | | | | |
|---|---|---|---|---|---|---|---|---|
| | | Alternaria rosae | Alternaria tenuis | Botrytis cinerea | Coniothyrium diplodiella | Fusarium culmorium | Macrosporium spec. | Penicillium crustaceum |
| 1 | Cl—CH₂—SO₂—NT—⌬ | 130 | 1.3 | 1.3 | -------- | 1.3 | 130 | 130 |
| 2 | Cl—CH₂—SO₂—NT—⌬(Cl) | 1.3 | 13 | 1.3 | 1.3 | 1.3 | 1.3 | 1.3 |
| 3 | Cl—CH₂—SO₂—NT—⌬(Cl) | 13 | 13 | 13 | 13 | 1.3 | 130 | 13 |
| 4 | Cl—CH₂—SO₂—NT—⌬—Cl | 13 | 1.3 | 13 | 13 | 1.3 | 13 | 1.3 |
| 5 | Cl—CH₂—SO₂—NT—⌬(H₃C) | 13 | 13 | 13 | 1.3 | 1.3 | 130 | 130 |
| 6 | Cl—CH₂—SO₂—NT—⌬(NO₂) | 13 | 13 | 1.3 | 1.3 | 1.3 | 13 | 1.3 |

Contrary to the new chloromethane sulphone-N-trichloromethane sulphenyl anilides, the benzene sulphone-N-trichloromethane sulphenyl anilide inhibits the germination of the spores of only one of the three fungi which were tested, as shown in Table II.

Table II

| No. | Compound (T=—S—CCl₃) | Necessary amount in γ per cm.² to inhibit the germination of the spores of— | | |
|---|---|---|---|---|
| | | Alternaria solani | Fusarium culmorum | Penicillium italicum |
| 7 | ⌬—SO₂—NT—⌬ | inactive at 130 | 1.3 | inactive at 130 |
| 8 | Cl—CH₂—SO₂—NT—⌬ | 13 | 1.3 | 13 |

In field trials, compound No. 1, chloromethane sulphone-N-trichloromethane sulphenyl anilide, gave particularly good results.

The new sulphenic acid amide derivatives can be used for the protection of plants and parts thereof from attack by injurious fungi, either as such or combined with suitable carriers and dispersing agents and also if desired with other fungicidal or insecticidal substances. They are suitable for the treatment of organic materials such as, e. g. wood, textiles, hides and leather.

For example, the active ingredients can be combined with solid pulverulent carriers such as, e. g. talc, kaolin, bole, bentonite, chalk, ground limestone, and the pulverulent fungicides so obtained can be made water suspendible if desired by the addition of wetting and dispersing agents. Further, the active ingredients can be dispersed in water with the aid of suitable emulsifying agents or dissolved in organic solvents, e. g. chlorinated hydrocarbons such as trichlorethylene or in medium petroleum fractions, if desired with the addition of auxiliary solvents such as acetone or higher ketones. Another use for the active ingredients is their dispersal in the air in the form of aerosols, smoke or steam, in particular, e. g. in store rooms and greenhouses.

EXAMPLE 2

2-5 parts of active ingredient, e. g. chloromethane sulphone-N-trichloromethane sulphenyl anilide are ground with 98-95 parts of talc. The pulverulent fungicide so obtained can be used, e. g. for the disinfection of bedding earth, also for the dusting of plants or parts thereof such as bulbs and tubers.

If the amount of active ingredient is increased to 15 parts and a little adhesive is added, then a strongly fungicidal non-toxic dry seed dressing which does not affect germination is obtained.

EXAMPLE 3

20 parts of chloromethane sulphonic acid-N-trichloromethane sulphenyl-4-chloranilide, 40 parts of xylene and 30 parts of ethylene oxide condensation products of alkyl phenols are mixed together. An emulsion concentrate is obtained which can be used for the preparation of emulsions in plant protection.

1 part of the concentrate according to Example 3 is dispersed in 200 to 50 parts of water to give agents ready for use containing 0.05 to 0.5% of active ingredient.

What we claim is:

1. A trichloromethane sulphenic acid derivative corresponding to the formula:

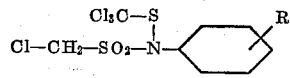

wherein R represents one member selected from the group consisting of hydrogen, chlorine, methyl and nitro.

2. The compound of the formula:

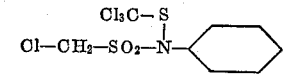

References Cited in the file of this patent

UNITED STATES PATENTS

| | | |
|---|---|---|
| 2,553,770 | Kittleson | May 22, 1951 |
| 2,553,775 | Hawley et al. | May 22, 1951 |